United States Patent Office 3,535,217
Patented Oct. 20, 1970

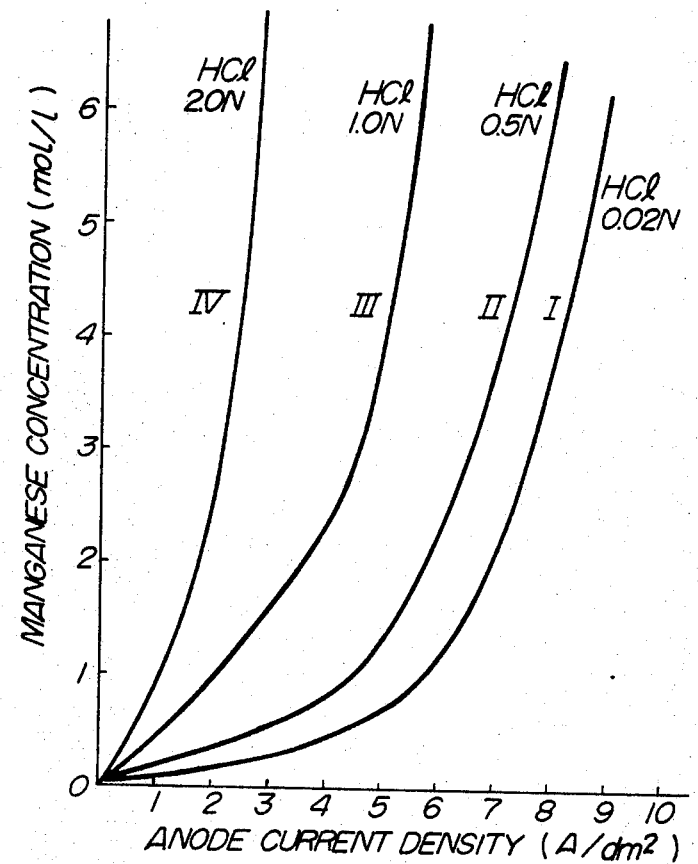
FIG. 1 AT 95°C
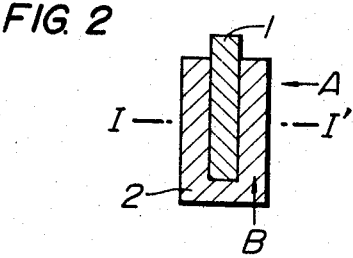
FIG. 2

3,535,217
PROCESS FOR ELECTROLYTIC DEPOSITION
OF MANGANESE DIOXIDE
Yasuji Amano, Hirakata-shi, Hiroshi Kumano, Daito-shi, Atsushi Nishino, Neyagawa-shi, and Yoshinori Noguchi, Moriguchi-shi, Japan, assignors to Matsushita Electric Industrial Co., Ltd., Osaka, Japan, a corporation of Japan
Filed Dec. 15, 1967, Ser. No. 691,046
Claims priority, application Japan, Dec. 1, 1966, 41/84,978; Feb. 10, 1967, 42/8,883; Mar. 20, 1967, 42/18,192; July 14, 1967, 42/45,995
Int. Cl. B01k 1/00; C01b 13/14
U.S. Cl. 204—96
9 Claims

ABSTRACT OF THE DISCLOSURE

A method for electrolytically producing manganese dioxide, comprising electrodepositing manganese dioxide on an anode by the anodic oxidation process using manganese chloride solution as an electrolytic bath, according to which manganese dioxide which is single-crystalline like [(021) plane of Ramsdellite] and physically and chemically highly active, particularly highly active as the cathode activating substance of dry cell can be produced.

---

Figure 3:
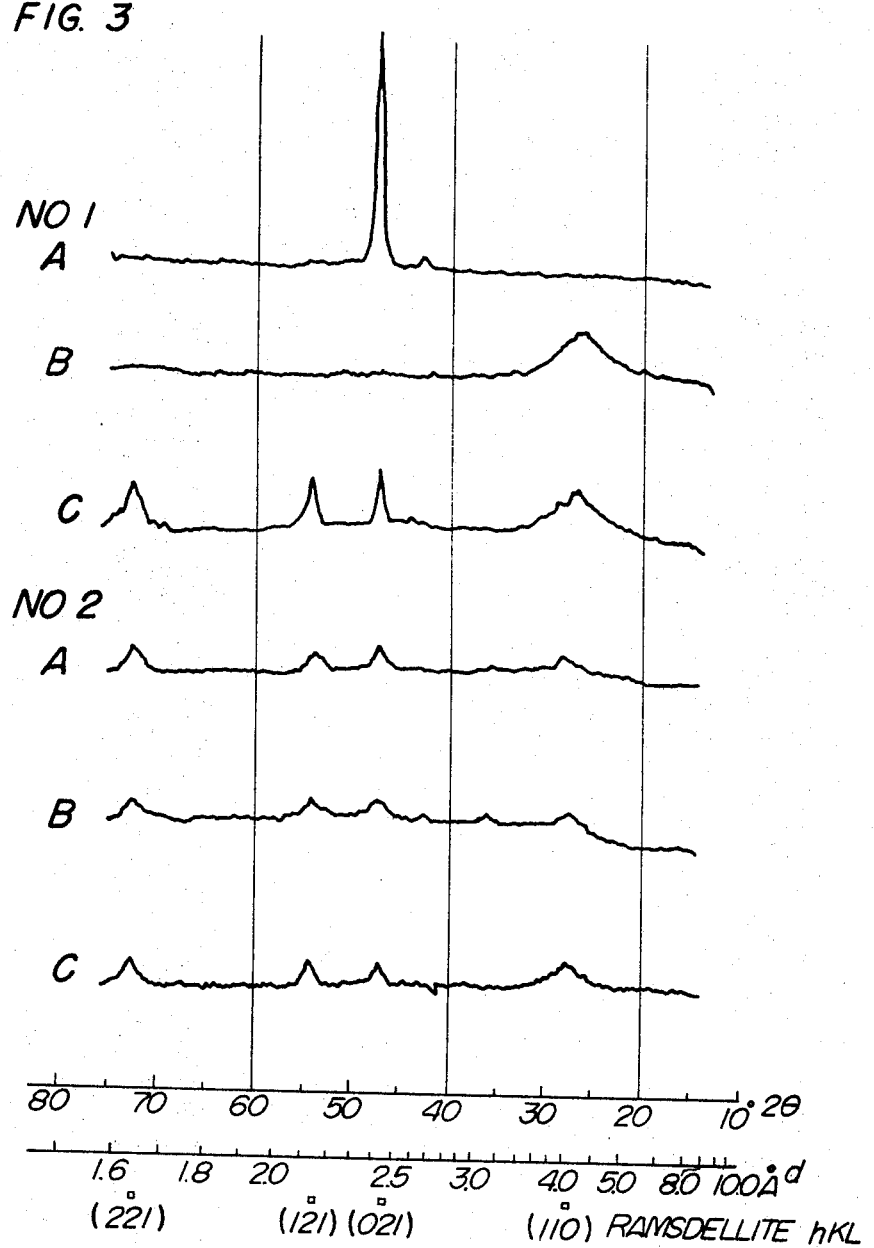

This invention relates to a method for producing manganese dioxide. More particularly, this invention relates to a method for producing manganese dioxide which comprises electrodepositing manganese dioxide on an anode by the anodic oxidation process using a platinum-plated titanium plate or highly corrosion resistant carbon electrode as an anode, carbon electrode as a cathode and manganese chloride solution as an electrolytic bath.

An object of this invention is to provide single-crystalline like manganese dioxide having physically and chemically high activity which is not possessed by the conventional electrodeposited manganese dioxide.

Another object of this invention is to provide manganese dioxide which is highly active as a cathode activating substance of a cell such as manganese dry cell and alkaline manganese cell.

Furthermore, this invention intends to provide a method for electrolytically producing manganese dioxide which is more advantageous than the conventional method.

The conventional electrolytic manganese dioxide has been industrially produced in a large quantity using purified dilute manganese sulfate solution formed by dissolving calcined natural ores or rhodochrosite with sulfuric acid. Manganese dioxide produced by such a method is powdery polycrystal of $\gamma$-$MnO_2$.

This method using a bath acidified with sulfuric acid has been a satisfactory method with respect to cost for production, operation, property of manganese dioxide.

Hitherto, a method of producing manganese dioxide from a manganese chloride bath acidified with hydrochloric acid has been neither utilized nor studied. This is due, in part, to certain disadvantages with respect to cost for production, working operation and corrosion resistance. Further, in such a method, no eletcrode can be used as an anode in the presence of hydrochloric acid. Moreover, the produced manganese dioxide is a catalyst for the production of chlorine and is a hydrochloric acid-soluble oxide. Recently, various materials which have high corrosion resistance against a bath acidified with hydrochloric acid have been developed. The inventors of this invention have variously studied the properties of these materials to a bath acidified with hydrochloric acid and succeeded in the production of single-crystalline like manganese dioxide which is remarkably excellent in orientation, in view of the fact that the conventional electrolytic manganese dioxide is powdery polycrystal of $\gamma$-$MnO_2$ (Ramsdellite) which has higher efficiency as compared to the natural manganese dioxide, but is unsatisfactory in physical and electrochemical activity.

It has been found that manganese dioxide produced by this invention has various physical and electrochemical properties which have not been possessed by the conventional electrolytic manganese dioxide.

The main features of this method using manganese chloride bath acidified with hydrochloric acid are as follows:

(1) The extractability of manganese in ores is improved. Recently, the natural resources of rhodochrosite have been notably drained and other natural ores must be used. In order to use the other ores, the ores must be calcined at a high temperature to reduce them into a basic oxide soluble in sulfuric acid so that leaching with sulfuric acid may be effected. However, if the leaching is effected under hydrochloric acid acidic state, not only rhodochrosite, but other manganese ores as they are can be advantageously leached with hydrochloric acid.

(2) The allowable range for optimum conditions of electrolysis is wide.

(3) The electrolysis can be effected at a relatively low temperature under high current density.

(4) The electric power efficiency is excellent.

(5) The electrodeposited manganese dioxide is single crystallinelike and has physically and electrochemically high activity.

(6) The manganese dioxide contains a minute amount of chlorine.

(7) The polarization rate of the manganese dioxide is low and utility is high.

(8) If necessary, a necessary amount of $Ca^{++}$, $Mg^+$, $Ba^{++}$, $K^+$, etc. can be simultaneously deposited in the high crystalline manganese dioxide.

(9) The manganese dioxide has the different electric resistances according to orientations as compared to the conventional manganese dioxide.

(10) The manganese dioxide has some small and vertical stripes, and cracks with orientation.

That is, manganese dioxide according to this invention has remarkably excellent features as mentioned in 5–10 as well as the advantages in the production thereof as in 1–4.

Main electrolysis conditions for producing manganese dioxide by electrolysis of a bath acidified with hydrochloric acid are as follows:

(a)
Concentration of hydrochloric acid—0.01–2.0 mol/l.
Concentration of $MnCl_2$—0.2–6.0 mol/l.
Temperature of bath—60° C.–99° C.
Current density—(0.3–8) A./dm.$^2$
Cell voltage—(1.75–5.5) v./bath.
Electrode—Ti-Pt plate or chlorine resistant electrode.

The electrolysis can be industrially advantageously effected using said conditions, but electrodeposited manganese dioxide can also be obtained under the conditions outside the above ranges. For example, concentration of hydrochloric acid less than 0.01 mol/l. can be employed, but it is industrially difficult to control the concentration. Furthermore, the electrolysis can be carried out with a concentration more than 2.0 mol./l., but the cell voltage rises and current efficiency and power efficiency are lowered with the formation of chlorine. (Namely anode polarization is encountered under said condition.)

When the concentration of manganese chloride is less than 0.2 mol/l., the current efficiency is notably lowered and control of the concentration can be difficultly effected. When more than 6.0 mol/l., it is difficult to dissolve and purify solution and from the industrial point of view, there is a large loss.

At a bath temperature lower than 60° C., the electrolysis can also be effected, but overvoltage of anode rises to a degree more than necessary and hence the current density must be considerably lowered. Therefore, employment of a temperature lower than 60° C. is not desirable from the industrial point of view. Further, at a temperature lower than 60° C., the overvoltage for crystallization is too high for the crystal growth of the electrodeposited manganese dioxide. Therefore, density and crystallinity of the electrodeposited manganese dioxide becomes low. Accordingly, manganese dioxide obtained by the electrolysis at a temperature higher than 60° C. is physically and electrochemically more active than that obtained at a temperature less than 60° C., and a temperature higher than 60° C. is more economical from the industrial point of view and with respect to the cell voltage, current density, etc.

Even at a current density lower than 0.3 A./dm.$^2$, manganese dioxide can be obtained, but the electrolysis at such a current density is not economical and therefore higher than 0.3 A./dm.$^2$ is preferable. When higher than 8 A./dm.$^2$, the current efficiency remarkably decreases and the crystallinity is also disordered. Therefore, a current density less than 8 A./dr.$^2$ is preferable.

The cell voltage is determined depending upon factors such as bath temperature, current density, scale of the cell, etc. However, exceeding said range is not preferable from the industrial point of view and with respect to the efficiency of manganese dioxide.

It is desirable that the purity of manganese chloride electrolyte is as high as possible, and the allowable ranges of contents of $NH^+_4$, $K^+$, $Na^+$, $Ca^{++}$, $Mg^{++}$, $Ba^{++}$, etc. are as low as possible, although this depends on the kind of ion.

This invention will be illustrated by the following example.

Figure 4:
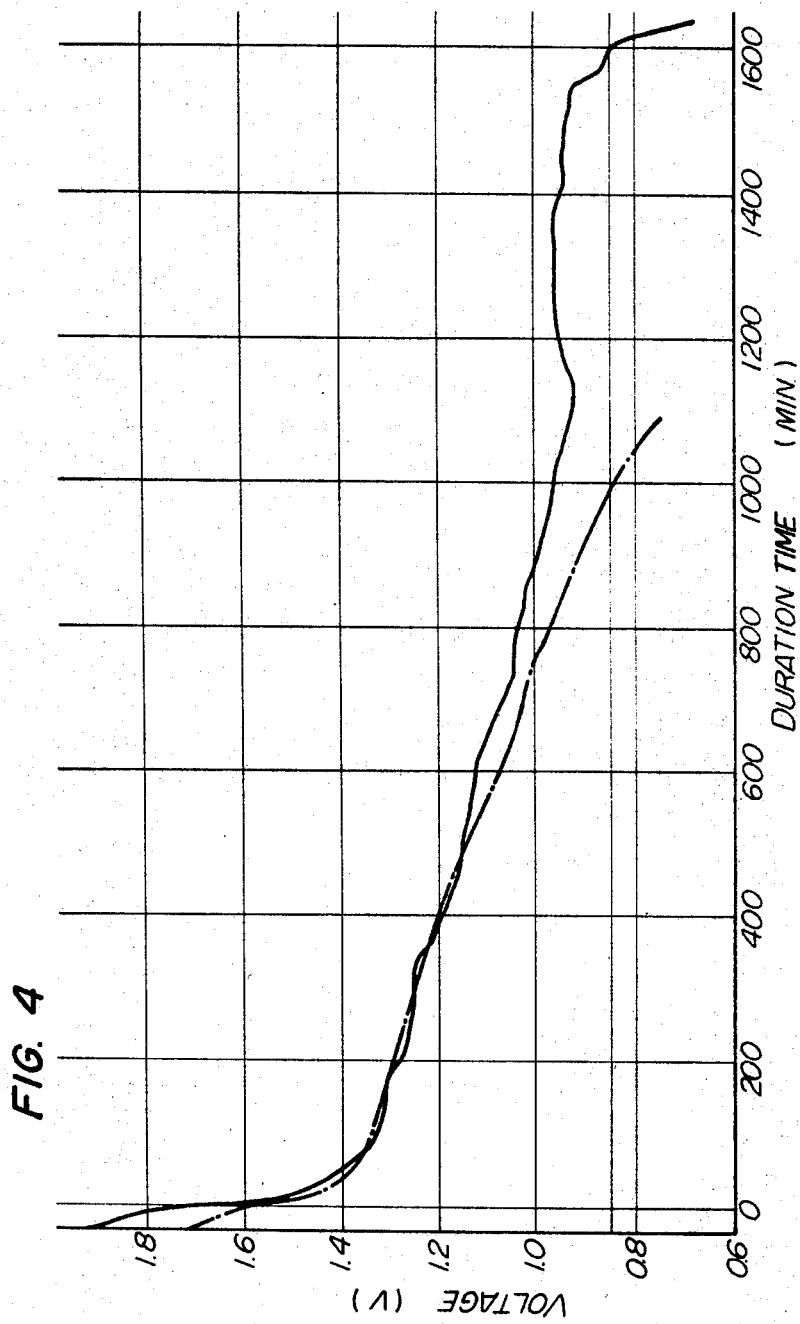
Figure 5:
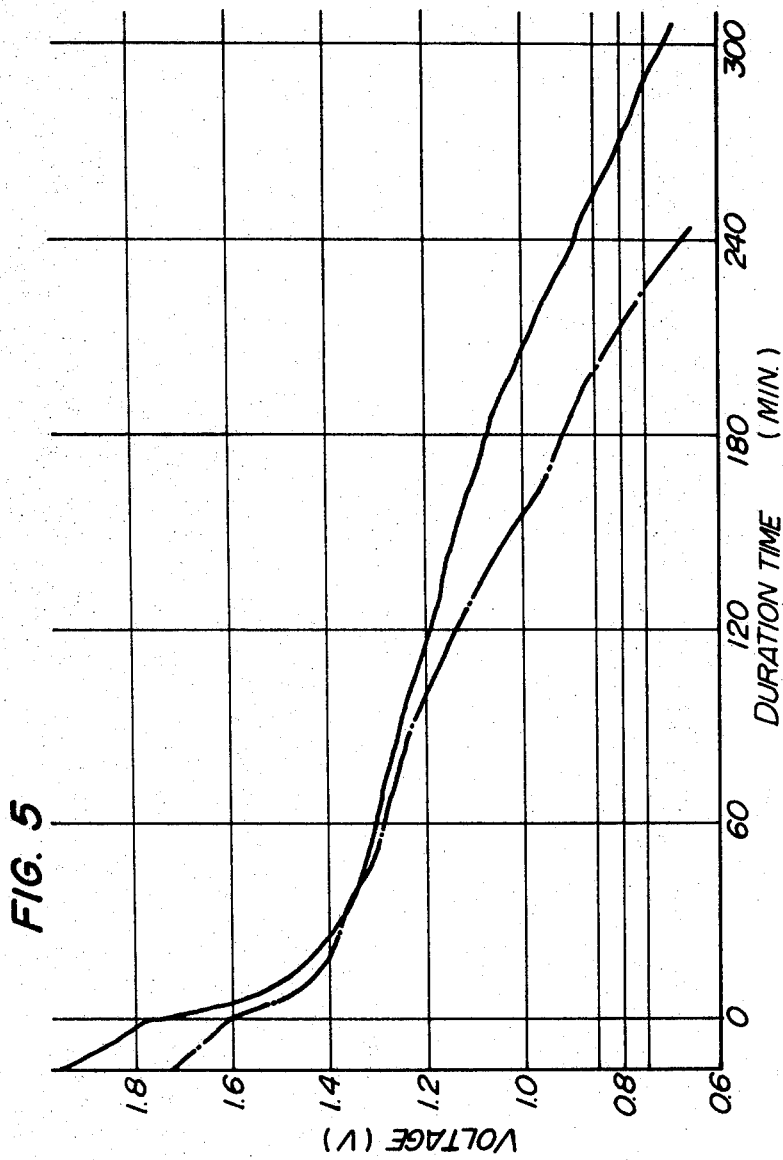
Figure 6:
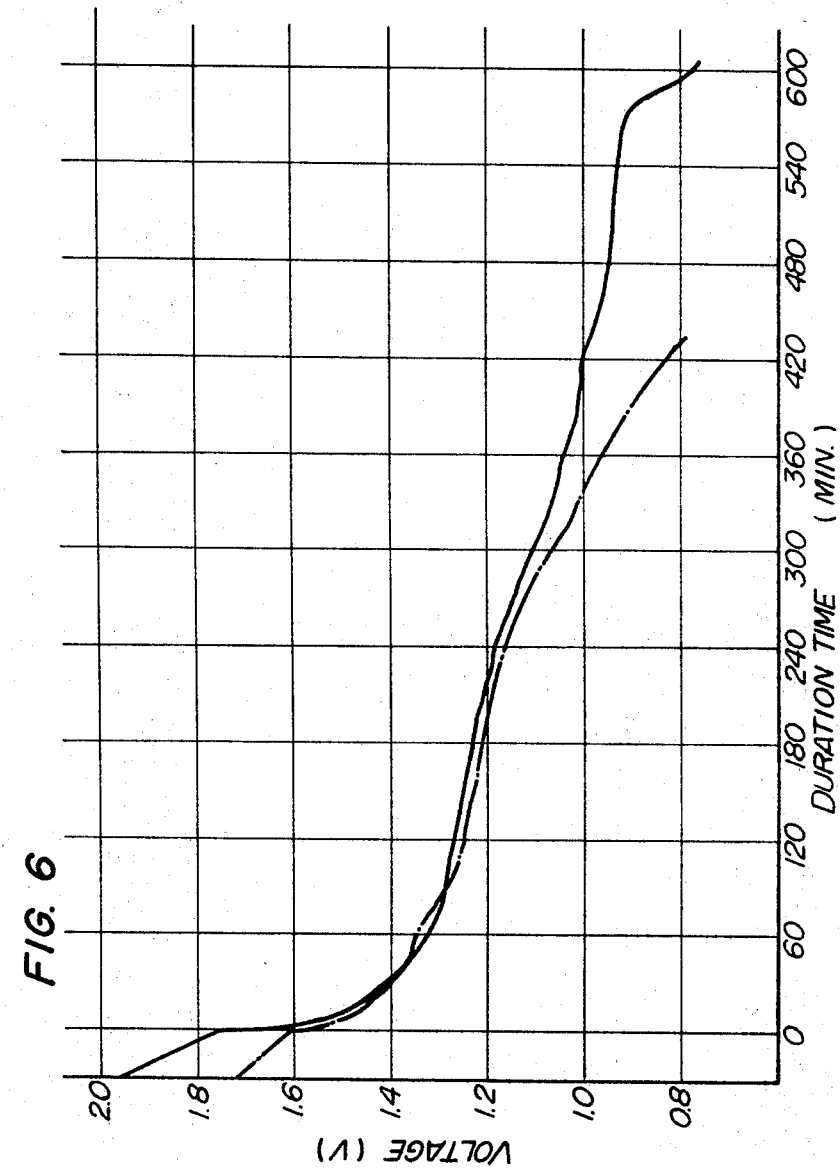

FIG. 1 shows the influence of each factor of concentration of manganese chloride, the current density and the concentration of hydrochloric acid within the range of said electrolysis condition (a) on the anode polarization. FIG. 2 shows manganese dioxide electro-deposited on the electrode and FIG. 3 is the X-ray diffraction diagram thereof. FIG. 4 is intermittent discharge characteristic graph of UM–1 type (D type in U.S.A.) dry cell in which manganese dioxide produced by the method of this invention is used as a cathode activating substance. FIG. 5 is the continuous discharge characteristic graph of UM–3 type dry cell. FIG. 6 is the intermittent discharge characteristic graph of UM–3 type dry cell.

When electrolysis is effected under the conditions within the ranges of said (a), it is possible to obtain satisfactory manganese dioxide. However, considering the economy of operation and the efficiency of manganese dioxide produced, said conditions are severely limited to the narrower ranges. In FIG. 1, when the concentration of hydrochloric acid is 0.02 N, satisfactory manganese dioxide can be produced in the area above curve I, but when the electrolysis is effected in the area below curve I, anode polarization occurs, the current efficiency considerably decreases and the cell voltage rises.

Similarly, when the concentration of hydrochloric acid is 1.0 N, curve III is obtained and the allowable ranges of the concentration of manganese chloride and the current density are much limited. Table 1 shows the results of the actual electrolysis effected under the typical conditions of FIG. 1. As is clear from the results, when the electrolysis is effected under the conditions in the area above each curve of FIG. 1, satisfactory manganese dioxide can be produced without the anode polarization.

However, considering the industrial operation and the cell activity as depolarizer in dry cell, the following are the optimum conditions for electrolysis.

(b)
Concentration of $MnCl_2$—0.2–1.5 mol/l.
Concentration of HCl—0.01–1 mol/l.
Current density—0.5–3 A./dm.$^2$
Temperature of bath—85–98° C.

The above can be considered to be the optimum conditions from the various standpoints of extraction rate of ores, reclaiming method of waste solution, efficiency of electrodeposited manganese dioxide, etc.

TABLE 1

| Concentration in electrolyte | | Current density (A./dm.$^2$) | Current efficiency percent | Initial cell voltage (v.) | Anode polarization? |
| --- | --- | --- | --- | --- | --- |
| HCL (N) | Mn++ (mol/l.) | | | | |
| 0.01 | 0.2 | 0.3 | 100 | 1.8 | No. |
| 1.0 | 0.2 | 4.0 | 50 | 4.5 | Yes. |
| 0.02 | 1.0 | 3.0 | 100 | 3.2 | No. |
| 2.0 | 1.0 | 3.0 | 20 | 2.5 | Yes. |
| 0.1 | 2.0 | 2.0 | 100 | 2.6 | No. |
| 1.5 | 2.0 | 2.0 | 60 | 2.5 | Yes. |
| 0.1 | 4.0 | 4.0 | 100 | 3.1 | No. |
| 0.02 | 4.0 | 4.0 | 100 | 3.3 | No. |
| 0.5 | 4.0 | 3.0 | 100 | 3.2 | No. |
| 1.0 | 4.0 | 6.0 | 40 | 3.5 | Yes. |

The following is an embodiment of this invention.

Electrolysis of manganese chloride solution acidified with hydrochloric acid ($MnCl_2$ 1.5 mol/l., hydrochloric acid 0.3–1.0 mol/l.) was effected at 95° C. for 150 hours with the current density of 2.5 A./dm.$^2$ using a highly corrosion resistant carbon electrodes as an anode and a cathode. As a result, manganese dioxide having highly excellent crystallinity was obtained at the average cell voltage of 2.6 v. and the current efficiency of 100%. The main features of the thus obtained manganese dioxide while are not found in the conventional product are as follows:

(1) Manganese dioxide according to this invention is (single-crystallinelike) $\gamma$-$MnO_2$ excellent in orientation observed with X-ray. The conventional electrolytic manganese is powdery polycrystal.
(2) Even after pulverized, the average diameter of crystal is different and the size of pulverized crystal has orientation.
(3) Manganese dioxide according to this invention is highly active in the cell and notably improves the cell efficiency at the continuous discharge, intermittent discharge, low temperature discharge, etc.

The following are the explanations of these features.

FIG. 2 shows manganese dioxide electrodeposited on carbon electrode by the electrolysis under said conditions. 1 is the carbon electrode and 2 is the electrodeposited manganese dioxide. FIG. 3 is a X-ray diffraction diagram of the manganese dioxide at A and B directions which is cut at I–I' line. Said A direction is vertical direction to the electrode surface and said B direction is rectangular direction to A, namely, parallel direction to the electrode surface. In FIG. 3, C is an X-ray diffraction pattern of the pulverized sample, and No. 1 shows the X-ray diffraction patterns obtained in this example. A, B and C of No. 2 are X-ray diffraction patterns obtained in the similar manner as mentioned above on the samples produced by the conventional method, namely, the electrolysis of manganese sulfate bath acidified with sulfuric acid (manganese sulfate 1 mol/l., sulfuric acid 0.1–0.5 mol/l.) at 93° C. for 150 hours with the current density of 0.9 A./dm.$^2$.

As shown in FIG. 3, the sample of No. 1A of this example has crystal which is excellent in orientation near single crystal aggregate at 47.5°–48° of $2\theta$ and at (0, 2, 1) of index of a plane of Ramsdellite. Further, it is clearly observed that No. 1 sample has crystal having orientation of (110) at plane B. The sample of No. 1C which is pulverized sample No. 1A has substantially the same crystal type as the conventional $\gamma$-$MnO_2$, but has far more excellent crystallinity than the product according to the conventional method on the strength of X-ray diffraction. On the other hand, regarding manganese dioxide obtained from the manganese sulfate electrolyte by the conventional method, as is seen from FIG. 2, A, B, and C are almost the same, that is, since the known electrolytic manganese dioxide is polycrystal similar to powder crystal, being different from No. 1, A, B, and C of No. 2 has the same diffraction patterns.

The novel electrolytic manganese dioxide produced under the above mentioned conditions has apparently vertical stripes and metallic luster. Further, this has such property as crushed with orientation of vertical stripes.

Even when the electrolysis is effected using manganese chloride bath under the conditions within said ranges, if the conditions cannot be maintained at the fixed degrees, for example, if the temperature abruptly rises or falls, the change of the temperature is abrupt, or the current density abruptly changes, it is difficult to produce a crystal excellent in orientation, but even in such a case, the product is more excellent in X-ray pattern and the cell capacity than the product by the conventional method.

From the X-ray diffraction pattern of these pulverized samples, the average diameter of crystal can be obtained using the following equation.

$$L = 0.89 \lambda / B \cos \theta$$

L = The average diameter of crystal.
$\lambda$ = Wavelength of X-ray.
B = Half width of diffraction pattern.
$\theta$ = Bragg angle.

The average diameter of ten typical samples is shown in Table 2.

As mentioned above, it is clear that the method of this example is physically remarkably different from the conventional method.

TABLE 2

| (hKL) | 110 | 021 |
|---|---|---|
| Method for production: | | |
| Conventional method | 26 A. | 98 A. |
| Method of this example | 18 A. | 200 A. |

Further, the results of measurements of resistance of these samples by means of the four probe method are shown in Table 3. The A and B directions in this table correspond to those in FIG. 2.

TABLE 3

| Direction of measurement | A direction $\Omega$. cm. | B direction $\Omega$. cm. |
|---|---|---|
| Method for production: | | |
| Method of this example | 275–330 | 7–12 |
| Conventional method | 145–175 | 155–168 |

As shown in Table 3, the product according to the method of this invention has very small resistance at axial direction of single crystal, but a large resistance at the rectangular direction. From this fact, it can be presumed that the product has a form of an aggregate of liner single crystal.

UM-1 type (D type in U.S.A.) and UM-3 type (AA type in U.S.A.) dry cells were produced using manganese dioxide produced by the method of this example and that produced by the conventional method as the cathode activating substances respectively. Table 4 shows the typical discharge duration periods (minutes), FIG. 4 shows the 4$\Omega$ intermittent discharge (30 min./day 6 days/week) curve of UM-1 type dry cell at 20° C., FIG. 5 shows the 10$\Omega$ continuous discharge curve of UM-3 type cell at 20° and FIG. 6 shows the 10$\Omega$ intermittent discharge (30 mm./day, 6 days/week) curve at 20° C. In the figures, the solid line indicates the cell of this invention and the chain line indicates the conventional cells.

TABLE 4

| Cell | Type of cell, UM-3 | | | | | | | | Type of cell, UM-1 | | | | |
|---|---|---|---|---|---|---|---|---|---|---|---|---|---|
| | Temp., 20° C. | | | | | Temp., 0° C. | | | Temp., 20° C. | | | | |
| | 10 $\Omega$ Continuous | | | 10 $\Omega$ Intermittent | | 10 $\Omega$ Continuous | | | 4 $\Omega$ Continuous | | | 4 $\Omega$ Intermittent | |
| | V., 1.00 | V., 0.85 | V., 0.75 | V., 1.00 | V., 0.85 | V., 1.00 | V., 0.85 | V., 0.75 | V., 1.00 | V., 0.85 | V., 0.75 | V., 1.00 | V., 0.85 |
| Cell of this invention | 203 | 255 | 293 | 422 | 580 | 128 | 167 | 203 | 350 | 860 | 1,108 | 840 | 1,610 |
| Conventional cell | 155 | 200 | 227 | 340 | 413 | 98 | 130 | 149 | 309 | 827 | 1,038 | 750 | 989 |

The mixing ratio of the cathode mixture of said dry cell is as follows:

Parts by weight
Manganese dioxide _____ 100
Graphite _____ 15
Acetylene black _____ 15
Ammonium chloride _____ 25
Zinc chloride _____ 10
Water _____ 30

As clearly seen from Table 4 and FIGS. 4, 5, and 6, manganese dioxide produced by the method of this invention yield higher initial voltage and display higher capacity in dry cell than those produced by other methods.

As mentioned above, manganese oxide according to this invention is not only physically characterized, but is highly active when used in the cells. Thus, the availability of UM-1 type and UM-3 type (Japanese Industrial Standard) through the resistance of 4$\Omega$ and 10$\Omega$ intermittent discharges at 20° C. is 45–65%, while that according to this invention is 87–95%.

Further, regarding the discharge product, a fine diffraction pattern of manganite was obtained according to this invention, but in the conventional method, a mixed crystal type diffraction pattern was obtained.

Besides, it is one of the characteristics of manganese dioxide according to this invention that it contains a few amount of chlorine. Further, it has a peculiar smell. Furthermore, this manganese dioxide generally has lower hardness, slightly smaller apparent specific gravity and slightly larger specific surface area than the product by the conventional method, although said facts are somewhat different according to the electrolysis conditions.

What is claimed is:
1. A process for producing electrolytic manganese dioxide comprising: placing an electrolyte consisting essentially of an aqueous solution of manganese chloride acidified with hydrochloric acid in an electrolytic cell having a cathode and an anode, said anode being resistant to corrosion by said electrolyte; and electrolyzing said solution by the anodic oxidation method in order to deposit manganese dioxide on said anode.

2. A process for producing electrolytic manganese dioxide comprising: placing an electrolyte consisting essentially of an acidified aquous solution of manganese chloride, having a manganese chloride concentration of 0.2 to 6.0 mols/l. and a hydrochloric acid concentration of 0.01 to 2.0 mols/l. in an electrolytic cell having a cathode and an anode, said anode being resistant to corrosion by said electrolyte; and electrolyzing said solution by the anodic oxidation method in order to deposit manganese dioxide on said anode.

3. A process for producing electrolytic manganese dioxide comprising: placing an electrolyte consisting essentially of an acidified aquous solution of manganese chloride, having a manganese chloride concentration of 0.2 to 1.5 mols/l. and a hydrochloric acid concentration of 0.01 to 1 mol/l., in an electrolytic cell having a cathode and an anode, said anode being resistant to corrosion by said electrolyte; and electrolyzing said solution by the anodic oxidation method in order to deposit manganese dioxide on said anode.

4. A process for producing electrolytic manganese dioxide comprising: placing an electrolyte consisting essentially on an acidified aqueous solution of manganese chloride, having a manganese chloride concentration of 0.2 to 6.0 mols/l. and a hydrochloric acid concentration of 0.01 to 2.0 mols/l., in an electrolytic cell having a cathode and anode, said anode being resistant to corrosion by said electrolyte; and electrolyzing said solution by the anodic oxidation method at a temperature of 60–99° C. and a current density of 0.3 to 8 A./dm.$^2$, in order to deposit manganese dioxide on said anode.

5. The process according to claim 3, wherein said solution is electrolyzed at a temperature of 85–98° C. and a current density of 0.5 to 3 A./dm.$^2$.

6. The process of claim 2, wherein said anode in said electrolytic cell is a carbon electrode or a platinum-plated titanium electrode.

7. The process of claim 6, wherein the cathode is a carbon electrode.

8. Electrolytic manganese dioxide produced by the method of claim 1.

9. In a method for manufacturing a dry cell, the improvement comprising using the electrolytic manganese dioxide of claim 8 as a depolarizer for said cell.

References Cited

UNITED STATES PATENTS

| | | | |
|---|---|---|---|
| 2,810,685 | 10/1957 | Sakowski | 204—105.1 |
| 2,631,115 | 3/1953 | Fox | 204—57 |
| 3,018,234 | 1/1962 | Litt | 204—96 |
| 3,117,066 | 1/1964 | Juda | 204—103 |
| 3,135,673 | 6/1964 | Tirrell et al. | 204—103 |

FOREIGN PATENTS

| | | |
|---|---|---|
| 369,573 | 11/1906 | France. |
| 514,523 | 7/1955 | Canada. |

TA HSUNG TUNG, Primary Examiner

U.S. Cl. X.R.

204—57, 290

UNITED STATES PATENT OFFICE
CERTIFICATE OF CORRECTION

Patent No. 3,535,217   Dated October 20, 1970

Inventor(s) Yasuji AMANO et al

It is certified that error appears in the above-identified patent and that said Letters Patent are hereby corrected as shown below:

One of the Convention Priority dates was misprinted in the above-identified patent, namely:

Japanese Patent Application was filed December 21, 1966, not December 1, 1966

SIGNED AND
SEALED
DEC 29 1970

(SEAL)
Attest:

Edward M. Fletcher, Jr.
Attesting Officer

WILLIAM E. SCHUYLER, JR.
Commissioner of Patents